United States Patent [19]
Wilfert

[11] 3,820,835
[45] June 28, 1974

[54] BUMPER FOR MOTOR VEHICLES
[75] Inventor: Karl Wilfert, Gerlingen-Waldstadt, Germany
[73] Assignee: Daimler-Benz Aktiengesellschaft, Stuttgart, Germany
[22] Filed: Oct. 6, 1972
[21] Appl. No.: 295,488

[30] Foreign Application Priority Data
Oct. 9, 1971 Germany............................ 2150445

[52] U.S. Cl. ................................. 293/88, 293/71 R
[51] Int. Cl. ............................................. B60r 19/08
[58] Field of Search............ 293/71 R, 88; 267/140, 267/141, 153; 114/219

[56] References Cited
UNITED STATES PATENTS

| | | | |
|---|---|---|---|
| 1,348,030 | 7/1920 | Millard............................ | 293/71 R |
| 1,532,487 | 4/1925 | Hayes............................... | 293/71 R |
| 1,696,429 | 12/1971 | Christen.......................... | 293/71 R |
| 2,144,357 | 1/1939 | Booharin ........................ | 293/88 |
| 3,294,254 | 12/1966 | De Ment......................... | 293/71 R |
| 3,493,257 | 2/1970 | Fitzgerald et al. ............. | 293/71 R |

Primary Examiner—M. Henson Wood, Jr.
Assistant Examiner—Robert Saifer
Attorney, Agent, or Firm—Craig and Antonelli

[57] ABSTRACT

A bumper for motor vehicles, especially passenger motor vehicles, which is automatically displaceable in the vehicle longitudinal direction under impact action; the back side of the bumper is thereby constructed approximately shell-shaped and equipped with at least two tubularly shaped extensions which are telescopically displaceable in associated fixed vehicle parts such as, for example, vehicle longitudinal bearers; the back side of the bumper is filled with an elastic material such as polyurethane foam which, on the one hand, covered with a rigid covering projects bulge-like forwardly over the edges of the back side and, on the other, extends through the extensions up to partition walls that subdivide the vehicle longitudinal bearers.

17 Claims, 2 Drawing Figures

PATENTED JUN 28 1974　　　　　　　　　　　　　　3,820,835
FIG. 1
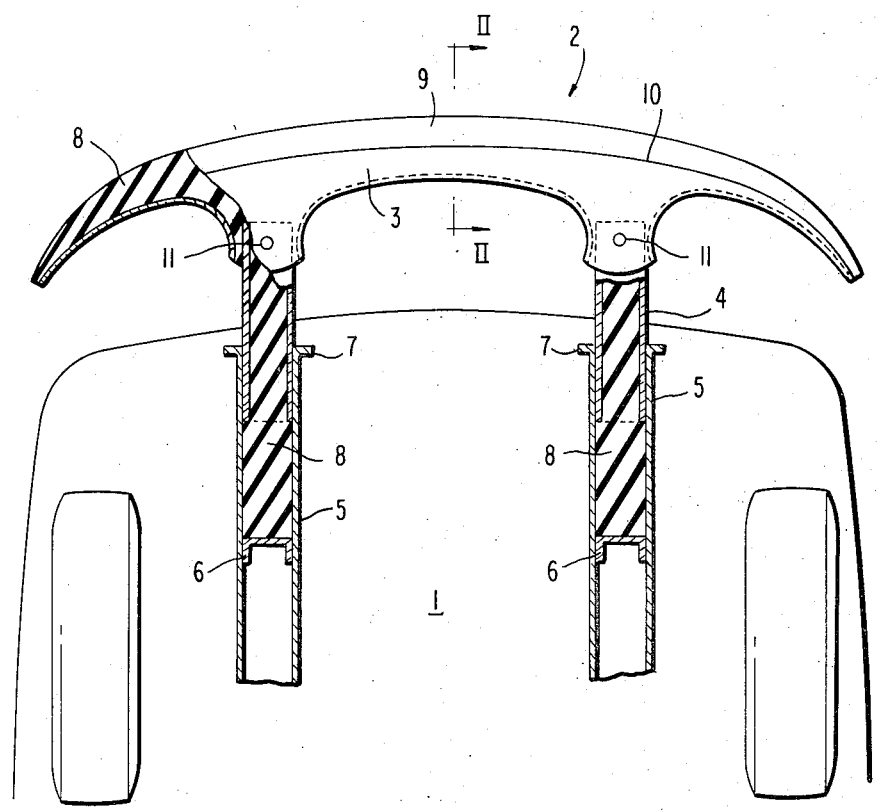
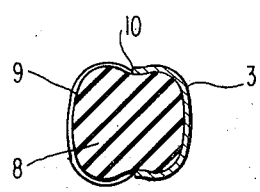
FIG. 2

BUMPER FOR MOTOR VEHICLES

The present invention relates to a bumper for motor vehicles, especially for passenger motor vehicles, which is automatically displaceable in the vehicle longitudinal direction under impact action.

For purposes of avoiding damages at the body of passenger motor vehicles in case of minor impacts or accidents, it has already been proposed heretofore on several occasions to connect the bumpers with fixed vehicle parts by interconnection of shock absorbers, springs or deformable intermediate members. However, such bumpers are heavy, and the accommodation of the elastically effective or deformable intermediate members proves extraordinarily difficult by reason of a lack of space.

It is the aim of the present invention to provide a bumper which does not entail the aforementioned disadvantages but which nevertheless fully satisfies the requirements made thereof also with simplest construction.

Accordingly, a bumper for motor vehicles, especially passenger motor vehicles is proposed which is automatically displaceable in the vehicle longitudinal direction under impact action, in which according to the present invention the back side of the bumper is constructed approximately shell-or dish-shaped in cross-section and is provided with at least two tubularly shaped extensions which are telescopically displaceable in coordinated fixed vehicle parts, for example, in the vehicle longitudinal bearers, whereby the back side is filled with an elastic material such as, for example, polyurethane foam, which, on the one hand, covered with a fixed, sturdy cover, projects bulge-like forwardly over the edges of the back side and which, on the other, extends through the extensions up to the partition walls which subdivide the vehicle longitudinal bearer.

A favorable flow of forces can be achieved if the back side is constructed thick-walled and its transitional area to the extensions is constructed approximately funnel-shaped with a continuous curvature.

In an advantageous construction of the present invention, the tubularly shaped extensions may be pivotally connected with the transversely disposed back side of the bumper.

During impact action, a tearing-in of the vehicle longitudinal bearers can be prevented if the latter are reinforced by a flange at the entry of the extensions.

Accordingly, it is an object of the present invention to provide a bumper for motor vehicles, especially passenger motor vehicles which avoids by simple means the aforementioned shortcomings and drawbacks encountered in the prior art.

Another object of the present invention resides in a bumper for motor vehicles which is relatively light in weight and does not pose any problems as to the accommodation of the elastically effective or deformable intermediate members.

A further object of the present invention resides in a bumper for motor vehicles which fully satisfies all requirements made thereof by an extraordinarily simple construction.

Another object of the present invention resides in a bumper of the type described above which achieves a favorable force flow while far-reachingly protecting the parts guiding the telescopic movement thereof against damages in case of impact.

These and further objects, features and advantages of the present invention will become more apparent from the following description when taken in connection with the accompanying drawing which shows, for purposes of illustration only, one embodiment in accordance with the present invention, and wherein:

FIG. 1 is a schematic view, partially in cross section, of a bumper in accordance with the present invention for a passenger motor vehicle; and FIG. 2 is a cross sectional view taken along line II—II of FIG. 1.

Referring now to FIG. 1, the end section 1 of a passenger motor vehicle which is indicated schematically in relatively thin lines includes a bumper generally designated by reference numeral 2 which possesses an approximately shell-shaped back side 3. Two tubular extensions 4 adjoining the back side 3, in particular a thick-walled back side 3, which has funnel-shaped portions extending transversely from the back side 3 with continuous curvatures, immerse in or telescope into vehicle longitudinal bearers 5 which are subdivided each by a partition wall 6. A flange 7 at the mouth of the longitudinal bearers 5 where the extensions 4 immerse into the same, prevents a tearing-in of the vehicle longitudinal bearers 5 in case of high load or stresses.

The back side 3 is filled with an elastic material such as, for example, polyurethane foam 8 which-closed off by a cover 9 of any suitable material — projects bead- or bulge-like in the forward direction over the edges 10 of the back side 3 and extends on the inside of the extensions 4 and of the vehicle longitudinal bearers 5 up to the partition walls 6.

It is, of course, within the scope of the present invention if the back side 3 of the bumper 2 is pivotally connected by means of hinges or bolts 11 with the tubularly shaped extensions 4.

In case of an impact action on the bumper 2, a great yieldingness is attained by the compression of the polyurethane foam 8 whereby the foam columns in the extensions 4 and in the vehicle longitudinal bearers 5 can be compressed up to approximately 60 percent of their original height without losing the capability to return slowly into the original position after cessation of the load.

The bumper construction of the present invention is equally applicable to front and rear bumper; the term back-side of the bumper referring in each case to the side of the bumper away from the exposed traffic side, i.e., nearer the respective vehicle end.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A vehicle bumper which is displaceable in a longitudinal direction of a vehicle under an impact action, said bumper comprising:
   a back side member having a first surface portion facing toward the vehicle and a second surface portion facing outwardly from the vehicle, said back side member having at least one opening, at least one extension means for extending from said back side member at the area of said opening to the vehicle, said vehicle having at least one respective fixed part of a hollow structure with said at least one extension means being telescopically displaceable in said fixed part, said extension means having a hollow structure, and elastic material projecting outwardly from said second surface portion of said back side member, said elastic material extending from said second surface portion through said opening in said back side member within said hollow structure of said extension means into said fixed part of the vehicle.

2. A bumper according to claim 1, characterized in that said at least one fixed part is a vehicle longitudinal bearer.

3. A bumper according to claim 1, characterized in that the elastic material is a polyurethane foam.

4. A bumper according to claim 1, wherein said back side member includes two openings, said extension means includes two tubular extension means, and said vehicle includes two fixed parts, each of said two tubular extension means extending from the area of respective ones of said two openings of said back side member to respective ones of said two fixed parts.

5. A bumper according to claim 4, wherein partition wall means are provided for subdividing each of said two fixed parts, and said elastic material extends into said respective ones of said two fixed parts to said partition wall means.

6. A bumper according to claim 5, characterized in that the back side member is constructed thick-walled, and each of said two openings are constructed approximately as funnel-shaped portions of said back side member extending transversely with a continuous curvature thereto, said funnel-shaped openings enclosing a respective end of said two extension means.

7. A bumper according to claim 6, characterized in that said ends of said extension means are pivotally connected with the transversely extending portions of said back side member.

8. A bumper according to claim 7, characterized in that said two fixed parts are reinforced by flange means at respective portions where the extension means enter the same.

9. A bumper according to claim 8, characterized in that said two fixed parts are vehicle longitudinal bearers.

10. A bumper according to claim 9, characterized in that the elastic material is a polyurethane foam.

11. A bumper according to claim 10, wherein rigid covering means are provided for covering said elastic material projecting outwardly from said second surface portion.

12. A bumper according to claim 11, wherein said back side member is a channel structure with said second surface portion being an open face of said channel structure, and said elastic material fills said open face of said channel structure.

13. A bumper according to claim 1, characterized in that said extension means are pivotally connected with said back side member.

14. A bumper according to claim 1, characterized in that the fixed part is constituted by longitudinal bearer means, and is reinforced by flange means at a portion where the extension means enter the same.

15. A bumper according to claim 1, wherein said back side member is a channel structure with said second surface portion being an open face of said channel structure, and said elastic material fills said open face of said channel structure.

16. A bumper according to claim 1, wherein said extension means is of a tubular construction.

17. A bumper according to claim 1, wherein rigid covering means are provided for covering said elastic material projecting outwardly from said second surface portion.

* * * * *